Aug. 26, 1930.  J. F. PETERS  1,773,854
COLLAR CAN BEADING MACHINE
Filed Sept. 28, 1923   7 Sheets-Sheet 5
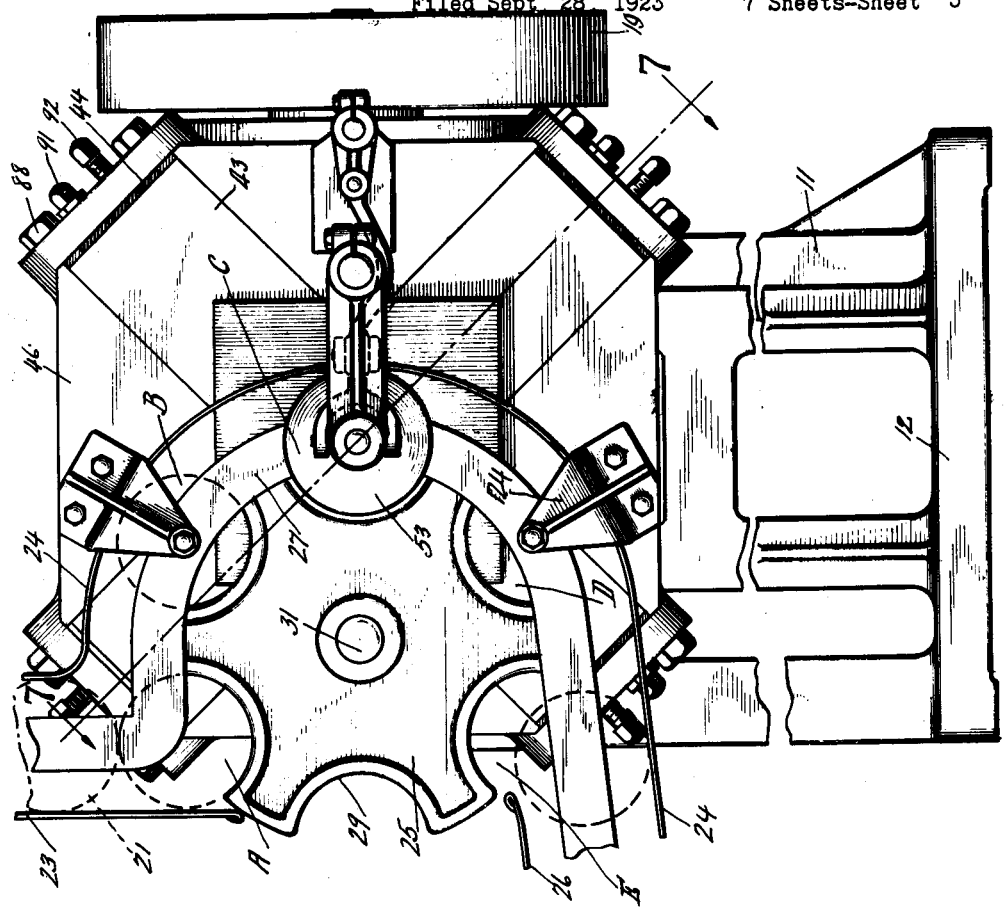
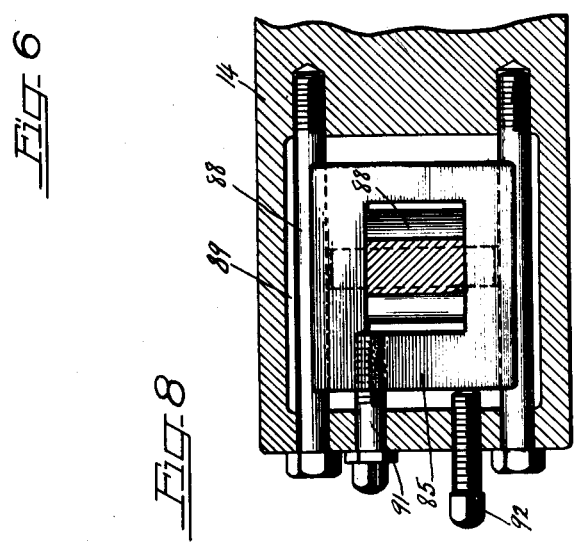
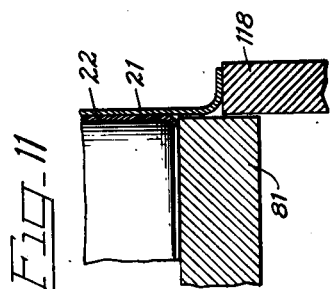
INVENTOR.
John F. Peters
BY Munday, Clarke &
Carpenter
ATTORNEY

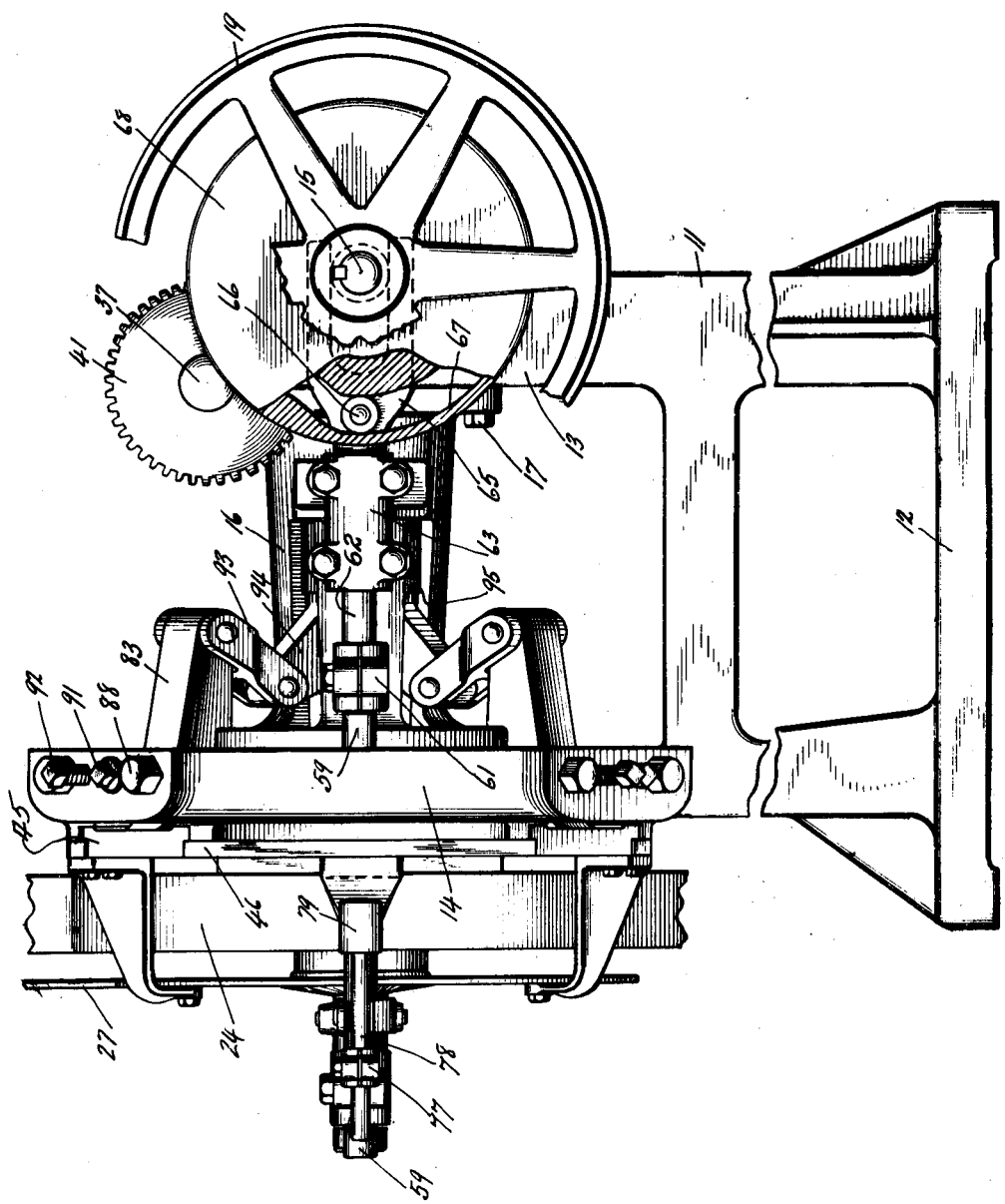

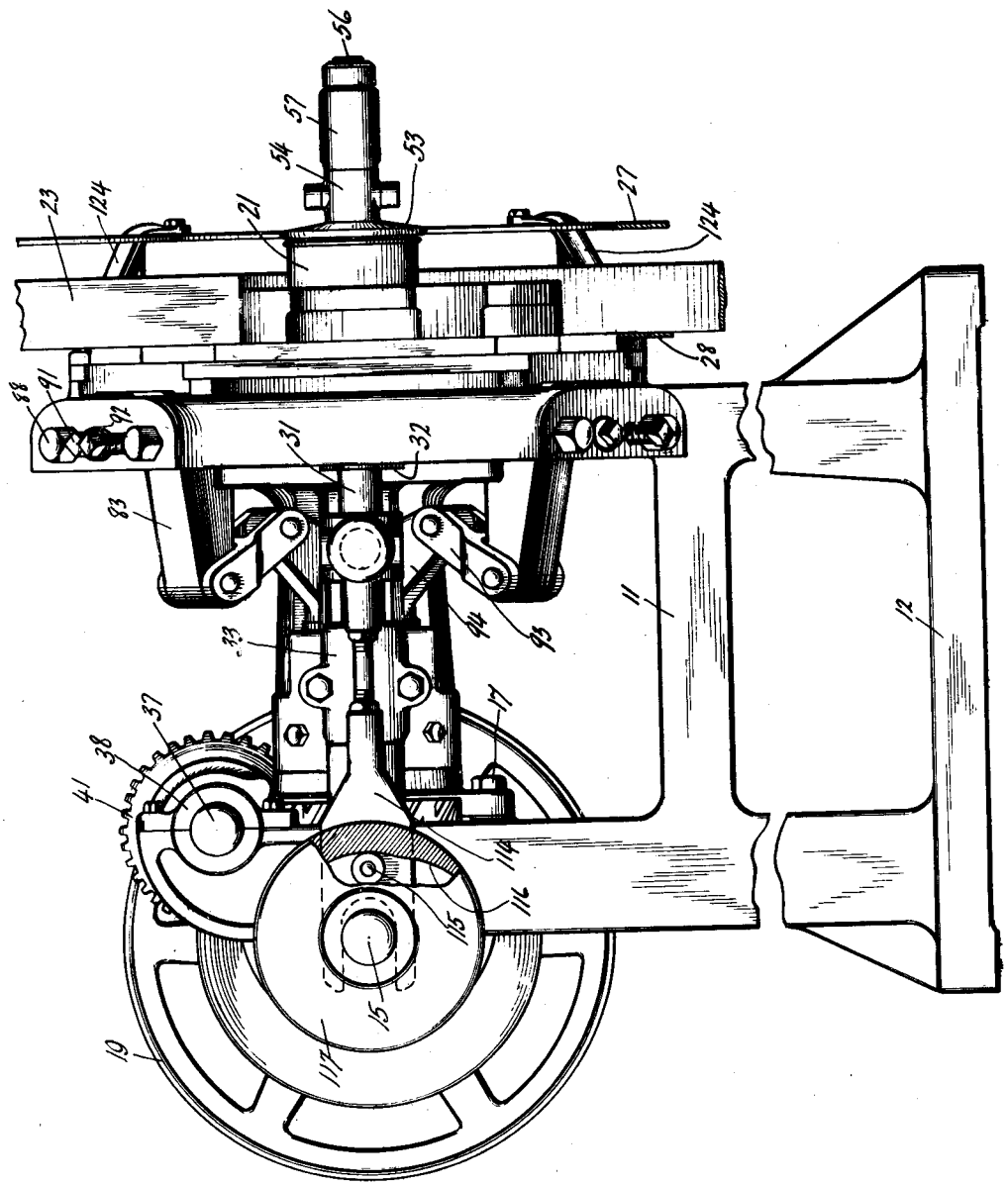

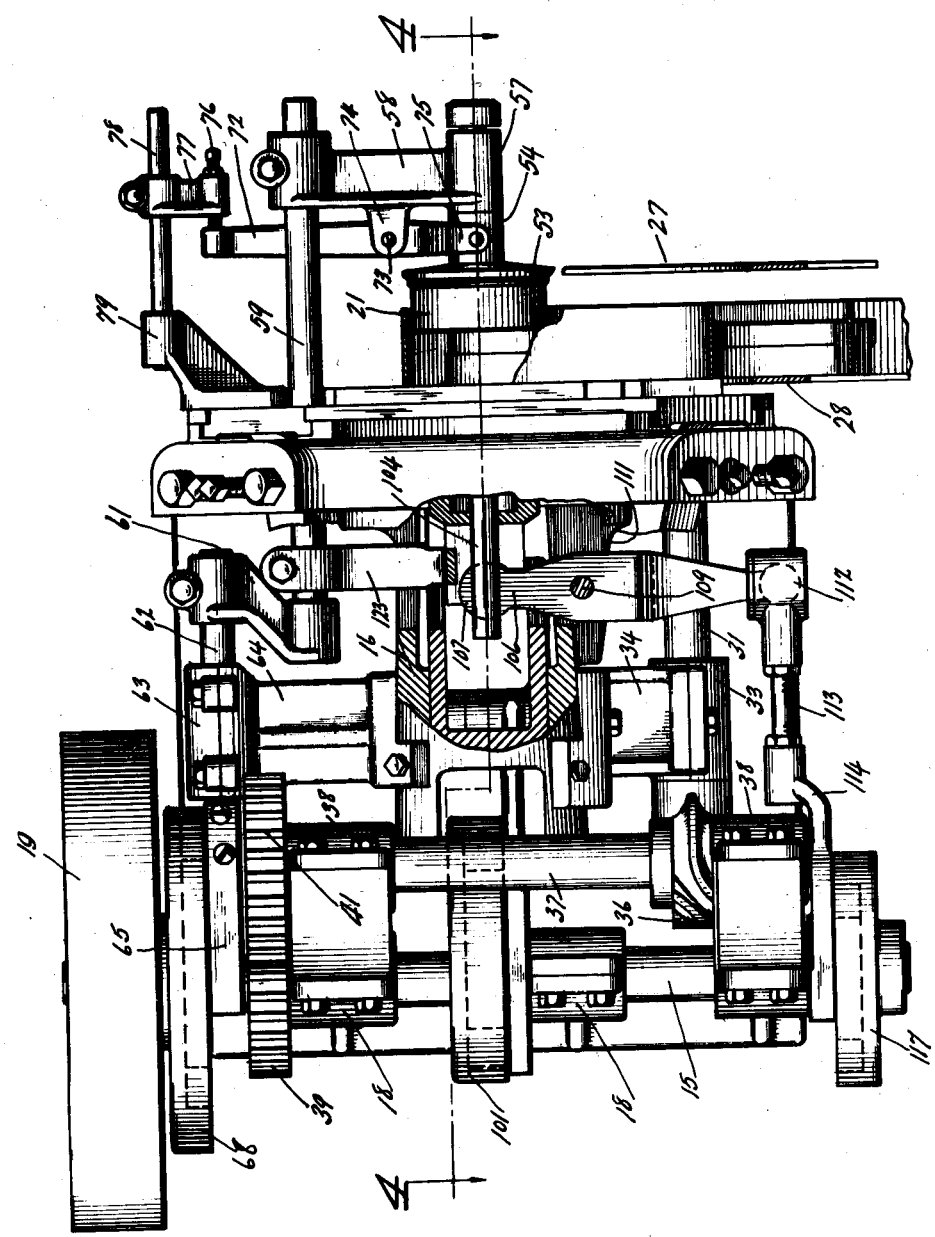

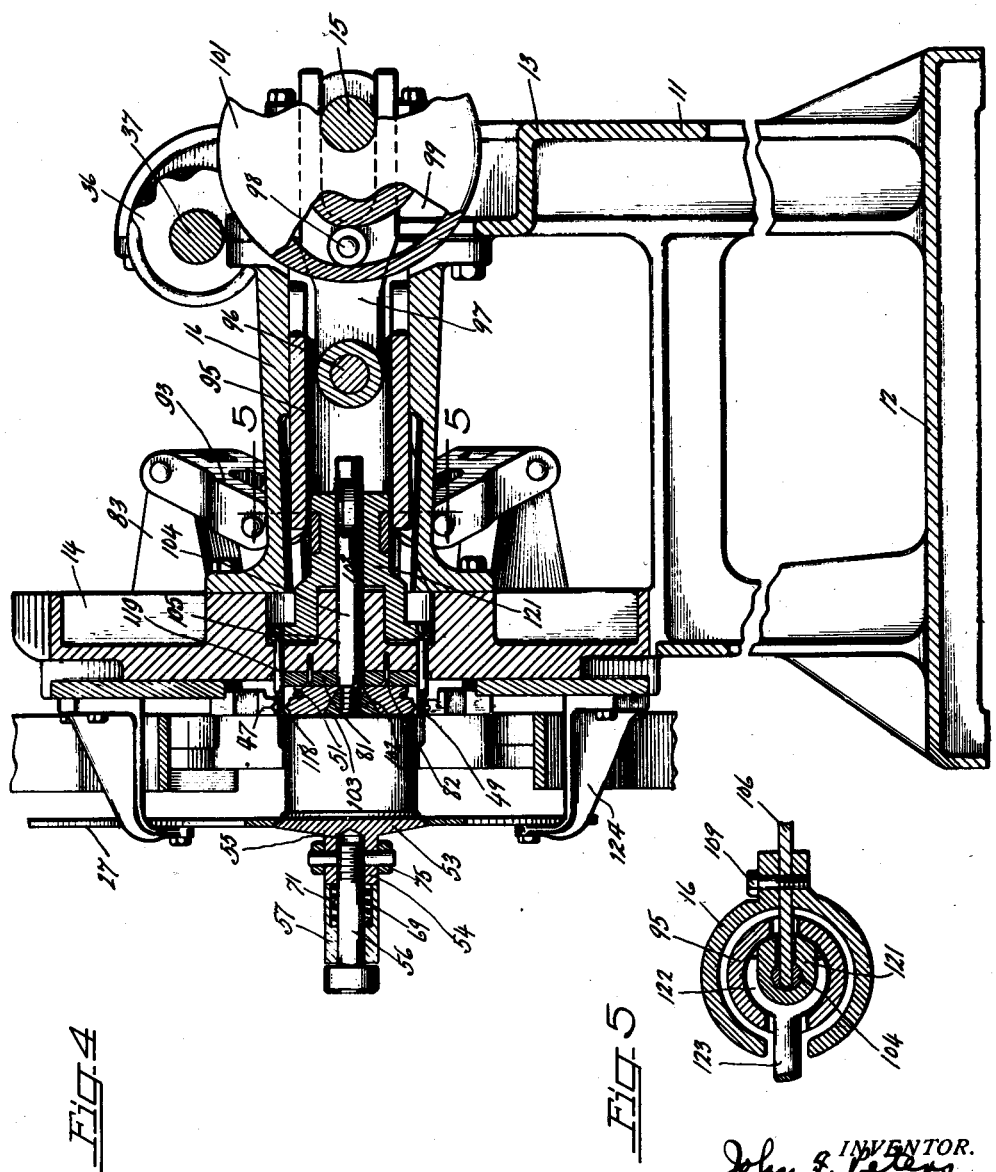

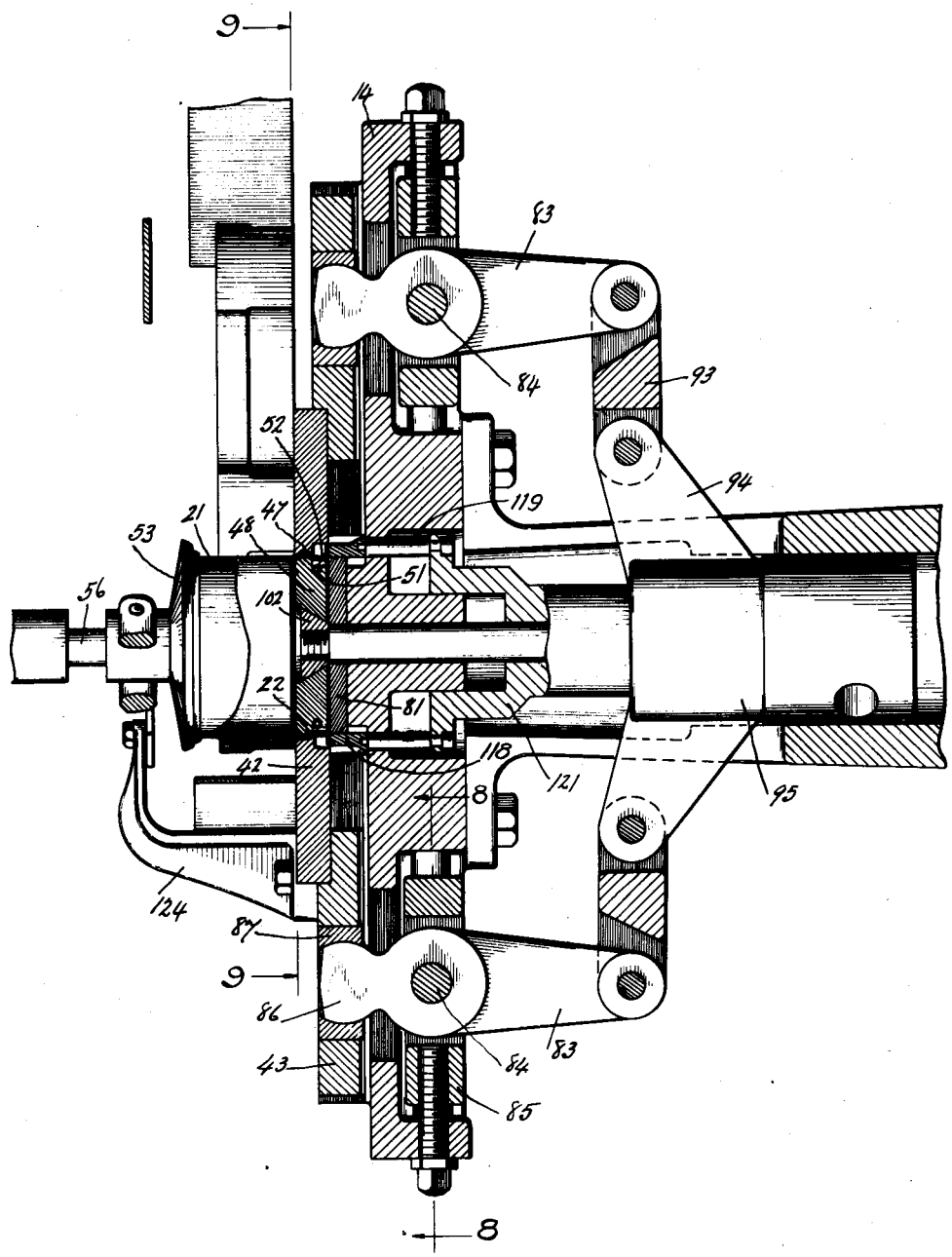

Aug. 26, 1930.  J. F. PETERS  1,773,854
COLLAR CAN BEADING MACHINE
Filed Sept. 28, 1923  7 Sheets-Sheet 7

INVENTOR.
John F. Peters
BY Munday, Clarke & Carpenter
ATTORNEY

Patented Aug. 26, 1930

1,773,854

UNITED STATES PATENT OFFICE

JOHN F. PETERS, OF ROCHESTER, NEW YORK, ASSIGNOR TO AMERICAN CAN COMPANY, OF NEW YORK, N. Y., A CORPORATION OF NEW JERSEY

COLLAR-CAN-BEADING MACHINE

Application filed September 28, 1923. Serial No. 665,385.

My invention relates to a machine for securing an interior collar member within the body of a container, and has for a principal object the provision of means whereby this operation may be automatically and rapidly performed.

The purpose of the machine may perhaps be best understood by first referring briefly to the type of container upon which it is adapted to operate, and in this connection attention is called to the co-pending application of John M. Young, Serial No. 514,588, which is assigned to the assignee of the present invention, by whom containers of this general form have been widely manufactured since the invention of said application was made.

In the type of container referred to a separate collar or neck member is positioned on the interior of the body and is adapted to form a support for a slip closure, which latter is provided by severing the material of the body below the top of said collar. A tearing strip is set off by score lines extending circumferentially around the container wall and the collar is secured to said wall below said tearing strip, so that when the latter is removed to open the container the contents will not be spilled.

The present invention is directed to the provision of a machine for securing the collar member to the body wall in a container of this character.

It is also an object of the invention to provide, in such a machine, means for securing said collar member in place merely by interfitting beads or creases formed by bending the material of the container and collar member together, a tight joint being thus provided without the use of solder or other extraneous connecting medium.

Another object is the provision of means for automatically handling the container bodies so that they are fed in rapid succession from a receiving station to a beading station and thence out of the machine in a minimum space of time and with the fewest possible operations.

A still further object of the invention is the provision of a machine for the purpose stated which involves a minimum number of working parts and performs its function with the least possible friction and with wholly automatic action.

Numerous other objects and advantages of the invention will be apparent as it is better understood from the following description, which, taken in connection with the accompanying drawings, discloses a preferred embodiment thereof.

Referring to the drawings,

Figure 1 is a side elevation of the machine, partially broken away to illustrate certain of the parts;

Fig. 2 is an elevation from the opposite side, also partially broken away;

Fig. 3 is a plan view, certain of the parts being broken away and some shown in section, for convenience of illustration;

Fig. 4 is a longitudinal section taken substantially along the broken line 4—4 in Fig. 3;

Fig. 5 is a detail sectional view, taken substantially on the line 5—5 in Fig. 4;

Fig. 6 is a front elevation of the machine;

Figure 7 is a sectional view taken substantially on the line 7—7 in Figure 6;

Figure 8 is a partial section showing the slide adjusting means being taken, substantially on the line 8—8 in Figure 7;

Fig. 11 is a longitudinal sectional view illustrating the location of the collar within the can prior to the beading operation.

Figure 9:
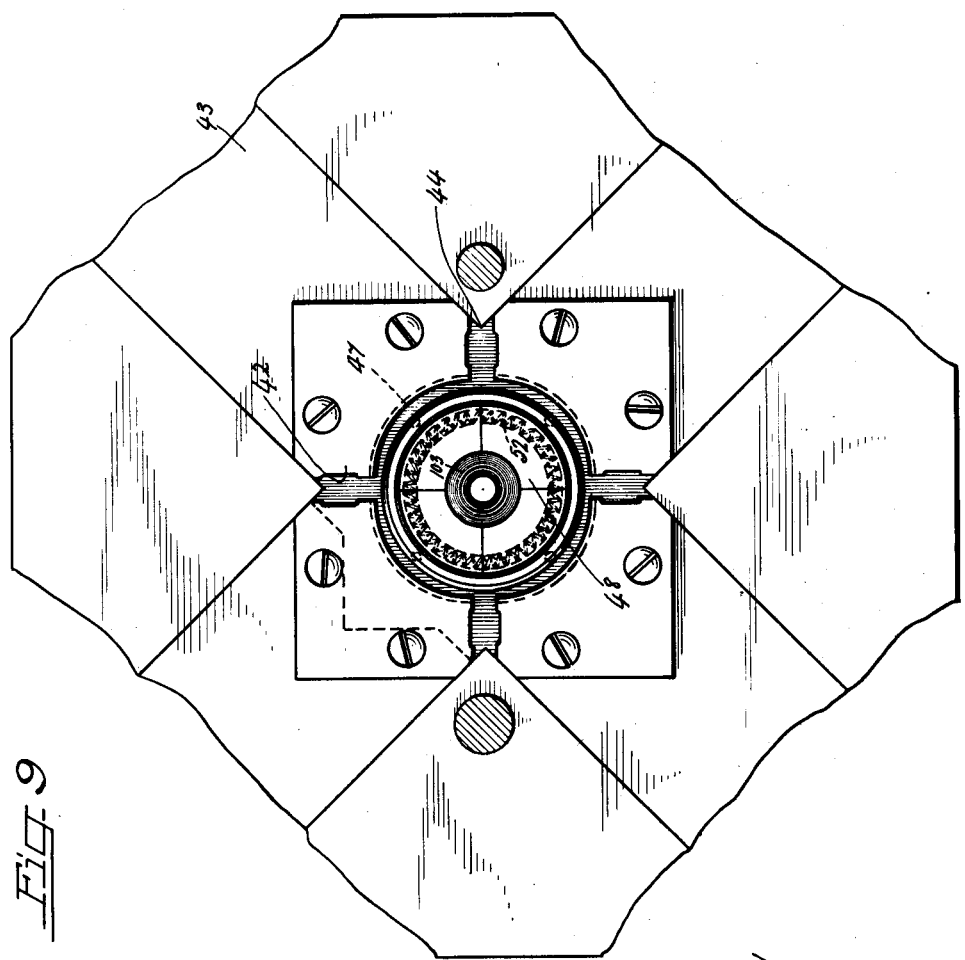
Figure 9 is a view taken substantially on the line 9—9 in Figure 7 and showing the beading jaws more in detail.

As thus illustrated, the machine comprises primarily a frame 11 having a base portion 12 and upwardly extending portions 13 and 14, the latter being of rectangular form and providing a support for the beading dies, and the former supporting and operating shaft 15 and associated parts. A hollow cylindrical member 16 connects the frame portions 13 and 14 near their top and is flanged and secured in place by bolts 17 or in any preferred manner. The drive shaft 15 is journaled for rotation in bearings 18 in the upper part of the frame extension 13 and is driven from any suitable source of power by means of a belt taking over a pulley 19 keyed to one end of said shaft.

The can bodies 21, with their previously inserted collars 22 (see Fig. 7), are fed into the machine through guides 23 and 24 (Fig. 6), the latter being of arcuate form and extending about a turret 25 by which the cans are moved to the successive stations indicated in Fig. 6 in the drawing. The station A is the receiving station and, as the turret is rotated with an intermittent motion, the can bodies are moved first to an idle station B; then to a beading station C where they are acted upon in a manner which will hereinafter appear; next to an idle station D; and finally to a discharge station E, from which they are directed out of the machine by an inclined guideway consisting of the guide plate 24 and a guide plate 26 positioned thereabove. Front and rear arcuate guides 27 and 28 are provided to prevent lateral displacement of the cans while in the pockets 29 of said turret.

Figure 10:
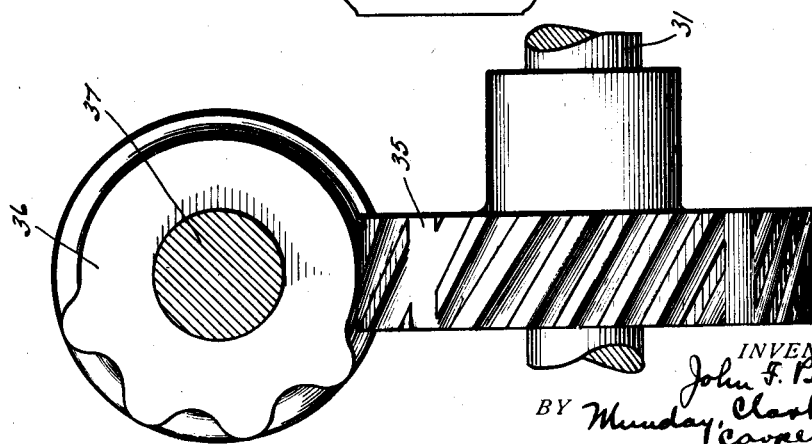
Figure 10 is an enlarged detail showing the mutilated spiral gearing for intermittently operating the feeding turret.

The turret 25 is driven with the desired intermittent motion by mechanism which is perhaps best shown in Figures 3 and 10. Said turret is fixedly secured to a longitudinal shaft 31, having a forward bearing 32 in the rectangular frame part 14 and a rear bearing 33 in a lateral extension 34 secured to the cylindrical member 16. Said shaft carries at its rear end a mutilated spiral gear 35 meshing with a mutilated pinion 36 which is mounted on a cross-shaft 37. Said shaft 37 is parallel to the shaft 15 and is journaled in bearings 38 at the upper end of the frame extension 13. The driving connection between said shafts 15 and 37 is attained by means of spur gears 39 and 41 secured respectively to said shafts. The mutilated gearing shown particularly in Figure 10 is adapted to convert the continuous rotating movement of a shaft 37 to an intermittent movement of the shaft 31 in a well known manner, and it is obvious that with this construction the turret 25 will be intermittently rotated in such manner as to cause the pockets thereof to come to rest at the various stations indicated in Figure 6 in order to permit the necessary operations upon the cans carried in said pockets.

When a can body with its inserted collar reaches the beading station C it is moved inwardly by mechanism to be hereinafter described, the end of the body in which the collar is positioned being brought into the zone of action of beading or creasing dies shown clearly in Figures 7 and 9. These dies consist of axially aligned inner and outer sectional jaw members between which the can body wall and collar member are clamped and beaded together through an expanding action of the inner jaw members and a corresponding contraction of the outer members.

The outside dies comprise hardened steel plates 42 secured to the inner end of slide blocks 43 disposed in radial slots or guideways 44 provided in the outer face of the rectangular frame part 14. Said slide blocks are formed with extended edges 45 (see Figure 1) and held in place by means of holding plates 46 secured to said frame part 14 and overlapping the edges 45. The plates 42 are provided with peripheral grooves 47 adapted to cooperate with projections on the inner die members to form a holding bead in the can body wall and inserted collar.

The inside dies comprise sectional plates 48 disposed in the same plane as the plates 42 and which are also formed of hardened steel or like material. Said plates are provided with peripheral projections 49 adapted to cooperate with the grooves 47 in the outer die members, as heretofore stated, and beneath said projections there is formed an annular channel 51 in which is disposed a circular spiral spring 52. Said spring serves to normally hold the plates 48 in their inner or collapsed position as shown in Figure 9. When in this position said plates form, in effect, a closed circular disk which is of less outside diameter than the inside diameter of the collar band 22 in the can.

Referring now to Figures 3, 4 and 6, the mechanism by which a can body is moved from its normal position in a turret pocket 29 to the operating position between the die plates 42 and 48 will be described. A disk or pad 53 is supported in front of the position of rest of the can at the station C and is adapted to be periodically reciprocated to cause it to engage the bottom of the can and to impart the desired movement thereto. Said disk is provided with a rearward extension 54 formed with a recess 55 in which the forward end of a stud 56 is threadedly engaged. Said stud extends through a boss 57 on a bracket 58 extending laterally from a rod 59 having bearings in the rectangular frame part 14. Said rod 59 is connected by means of a bracket 61 with a rod 62 having a bearing 63 in a lateral projection 64 secured to the cylindrical member 16, said rod 62 being connected at its rear end to a cam yoke 65 straddling the shaft 15 and provided with a cam following roller 66 adapted to engage within a cam groove 67 in a cam 68 mounted on said shaft 15 adjacent the pulley 19. By this mechanism the bracket 58 is reciprocated upon movement toward the left, viewing Figure 3, the pad 53 comes in contact with the end of the can body 21 and moves the latter into position for beading or creasing.

Upon rearward reciprocation of the bracket 58 the pad 53 tends to pull away from the can body and in order to yieldingly hold said body as the latter is being ejected from the beading dies, by mechanism to be later described, I provide a spring 69 positioned about the stud 56 and within a recess 71 in the bracket boss 57. Said spring exerts tension upon the rearward extension 54 of the disk 53 and tends to hold it positively in contact with the can end. Near the end of the backward stroke the disk is released from engagement with said can end by mechanism shown particularly by Figure 3. A lever 72 is pivoted at 73 to an extension 74 of the bracket 58 and has a bifurcated end 75 secured to the extension 54 of said disk 53. The upper end of said lever is adapted to contact with an adjusting screw 76 positioned in a bracket 77 extending laterally from a rod 78 which projects from a bracket arm 79 secured to the frame. This causes the spring 69 to be compressed and forces the extension 54 on the disk 53 into contact with the face of the boss 57 as shown in Figure 3.

Upon the initial forward movement of said bracket 58 the lever 72 is disengaged from the adjusting screw 76 and the spring 69 is permitted to expand forcing the disk extension 54 forwardly and out of contact with the boss 57. The pad or disk 53 then engages the end of the can body and maintains a yielding contact therewith, both while it is moving toward and away from the beading position.

The can body, having been positioned between the inner and outer beading jaws, the latter are brought into action to perform the beading operation, and the mechanism whereby this is accomplished is shown in detail in Fig. 7.

Prior to the operation of said beading mechanism, the collar 22, within the can, is correctly located by means of a plate 81 (Fig. 11) secured to the face of the rectangular frame part by means of screws 82 (see Fig. 4) and adapted to enter the mouth of the can to any place between the pad 53 and a stripper ring 118 to be later described.

The outer jaws 42 are moved inwardly by means of levers 83 pivoted at 84 to an adjusting block 85 and having heads 86 movably engaging in blocks 87 secured in the slides 43. Said adjusting block 85 is slidably held upon studs 88 extending through a recess 89 in the rectangular frame part 14 and is adjustably positioned by means of an adjusting screw 91 and a set screw 92 (see Fig. 8). It will be understood that a lever 83 and associated mechanism is provided for each of the slides 43, or at the four corners of the rectangular frame part 14. The inner ends of said levers are connected by links 93 to arms 94 of a crosshead 95 mounted within the cylindrical member 16. Said crosshead is connected at 96 to a cam yoke 97 provided with a cam following roller 98 engaging within a cam groove 99 in a cam member 101 on the shaft 15 (see Figure 4). The sliding movement of the crosshead 95, through the mechanism just described, operates the slides 43 to bring the die plates 42 into operative position.

Simultaneously with the contraction of the outer jaws the inner jaws 48 are expanded so that the projections 49 thereon are forced against the interior of the collar 22, bending the latter and the wall of the can into the groove 47 in the outer die parts 42. This is accomplished by means of a conical block 102 engaging in a countersink 103 formed at the center of the inner die parts, said block being secured to a sliding rod 104 extending rearwardly through a bore 105 in the frame part 14. Said rod is connected at its rear end with a lever 106, a head 107 of which engages within a slot 108 in said rod. Said lever is pivoted at 109 to a rib 111 on the cylindrical member 16 as shown particularly in Figures 3 and 5. The opposite end of said lever 106 has a ball and socket connection 112 with a rod 113 which is provided at its rear end with a cam yoke 114 straddling the shaft 15 and carrying a cam following roller 115 engaging a cam groove 116 in a cam 117 on the shaft 15. Upon the sliding of the rod 104 toward the rear, the conical block 102 engaging in the countersinks 103 of the internal sectional jaws 48 forces said jaws outwardly against the tension of the spring 52. This obviously results in bending or creasing the material of the can body wall and the inserted collar 22 between the projections 49 on the inner jaws and the circular grooves 44 on the outer jaws, producing an interfitting bead by which the collar 22 is securely held in place within the can body.

Upon completion of the beading operation, the jaws 42 and 48 are separated by their respective operating mechanisms, previously described, and the can body is ejected by means of a stripper mechanism shown in detail in Figs. 3 and 4. Said mechanism comprises a ring 118 connected by pins 119 with a flanged cup-shaped member 121 slidably mounted within the crosshead 95 and about the rod 104. Referring now to Figs. 5 and 3, it will be seen that the member 121 is engaged by a yoke 122 formed on one end of a strap 123, which latter is connected to the sliding rod 59 (see Fig. 3). When said rod 59 is moved forwardly, i. e. toward the front of the machine and in direction to retract the pad 53, said member 121 is moved in like direction and forces the can body out of the zone of action of the dies and into its normal position in the turret pocket 29. During this action, as previously stated, the pad 53 is held in contact with the end of the can until the lever 72 comes in contact with the screw 76, thereby compressing the spring 69 and causing said pad to move out of contact with said can.

The can body and inserted collar, being completely connected, are moved by the turret 25 from the station C to the idle station D and upon the next rotation of the turret are discharged from the machine. It will be noted that the guides 24 and 26 are inclined so that the cans are permitted to roll by gravity from the turret pockets 29 to any desired receiving station. The arcuate guide 27 which is held in place by means of brackets 124 secured to the holding plates 46, may be continued along the guideway formed by the upper and lower plates 26 and 24, as may also the guide 28, so that the cans will be held against lateral displacement as they roll down said guideway.

The operation of the apparatus selected as the at present preferred embodiment of the invention may be briefly summarized as follows: The can bodies with the collars already inserted are delivered to the machine down guides 23 and 24. The bodies thus collared are successively received in the pockets 29 of the turret 25 which constitute holders for the collared bodies. The intermittent advancement of the turret arranges these collared bodies thus held, in alinement with beaders or creasers which at the beading or creasing station are axially alined with the holder and its contained collar body. The creasers may be considered to consist of the internal expanding die members or plates 48, each of which is itself a creaser or beader and all of which together also may properly be considered a creaser. At the creasing or beading station the creasing organization is inserted into the collared body by sliding the body and collar lengthwise in the holder. External die plates 42 having a groove for receiving the complemental creases to be produced in the collar and body are arranged in contact with the outer face of the body and opposite the creasers.

Thereafter the conical block 102 is moved to the right viewing Fig. 7 to press the creasers against the presented collar face to operate the creasers to form the complemental creases mentioned, this preferably occurring near the inner edge of the collar.

The expander or wedge block 102 operates under the action of a system of links and levers from cam 117 as will be readily understood to operate the creasers. After the beading or creasing action the block is moved back by this mechanism to its inoperative position, spring 52 withdrawing the creasers from creasing position. Thereafter the body is moved out of the path between the creasers and outer dies by the pins 119 on the ring 118 which engage the flange of the can body. Further rotation of the turret brings the can body under guide 26 which removes it from the holder or turret pocket for discharge.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine of the class described, the combination of beading dies, means having yielding contact with a container body for moving it into the sphere of action of said dies, means for operating the dies to connect an interior collar member to the body wall, means for ejecting the assembled container from said dies, and means for releasing said first mentioned means from contact with the body when the latter has been ejected and delivered to position for discharge from the machine.

2. In a machine of the class described, the combination of beading dies, means for positioning a can body having a separate member inserted therein between said dies, means for operating the dies to connect said member to said body, means exerting a yielding pressure on the can body at it is moved both to and from the dies, and a stripper mechanism for removing the body from said dies.

3. In a machine of the class described, the combination of sectional beading dies, means for positioning a can body and inserted collar between said dies to a point below the end of the body and means for operating the dies, said last mentioned means being adjustable to vary the die stroke.

4. In a machine for beading together can bodies and open-ended collars inserted therein, the combination of means for positioning can bodies having collars inserted therein, and means for automatically beading said collars and bodies together at a point within the ends of the bodies, said beading means providing a free space for the flanges of said bodies.

5. In a machine for beading together can bodies and open-ended collars inserted therein, the combination of means for positioning can bodies having collars inserted therein, and means for automatically beading said collars and bodies together at a point within the ends of the bodies, and means for adjusting the collar endwise within the body prior to the action of the beading means.

6. Mechanism for operating upon tubular can bodies having inserted annular sheet-metal collars, comprising a holder, means for supplying a collared body such as described to the holder, a creaser axially alined with the holder and the body therein, means for relatively arranging the creaser and body so that the creaser is within the body, and means for then operating the creaser to produce complemental bead creases in the can wall and inner margin of the collar.

7. The combination of means for holding can bodies, internal and external beading dies arranged in axial line with said holding means, a collar placing plate arranged at the outer side of the internal beading dies, means for causing the internal beading dies to be within the can body, means for causing the placing plate to be within the can body in engagement with the edge of the collar, means for operating the dies, after the collar is placed, to mutually bead the body and collar, and mechanism operating said parts in timed relation.

8. In a machine of the class described, the combination of means for holding a can body, a plate for preliminarily positioning a collar within said body with the outer edge of the collar at a distance within the outer edge of the body, means for beading said collars and bodies together at a point below the ends of the bodies, after said collar has been placed by said plate, and mechanism operating said parts in timed relation.

9. The combination of mechanism for inserting open collars tightly into can bodies so that said collars are frictionally held from movement, chutes for the can bodies and collars respectively leading to said inserting mechanism, means for beading together said can bodies interiorly and exteriorly to hold the collars at a fixed point between the ends of said bodies, and devices for causing said collar inserting mechanism and beading means to function cooperatively.

10. The combination of mechanism for inserting open collars tightly into can bodies so that said collars are frictionally held from movement, chutes for the can bodies and collars respectively leading to said inserting mechanism, means for beading together said can bodies interiorly and exteriorly to hold the collars at a fixed point between the ends of said bodies, and devices for moving the bodies and inserted collars from said inserting mechanism to said beading means.

JOHN F. PETERS.